J. E. WISNER.
HORSE HAY-RAKES.
No. 194,282. Patented Aug. 14, 1877.
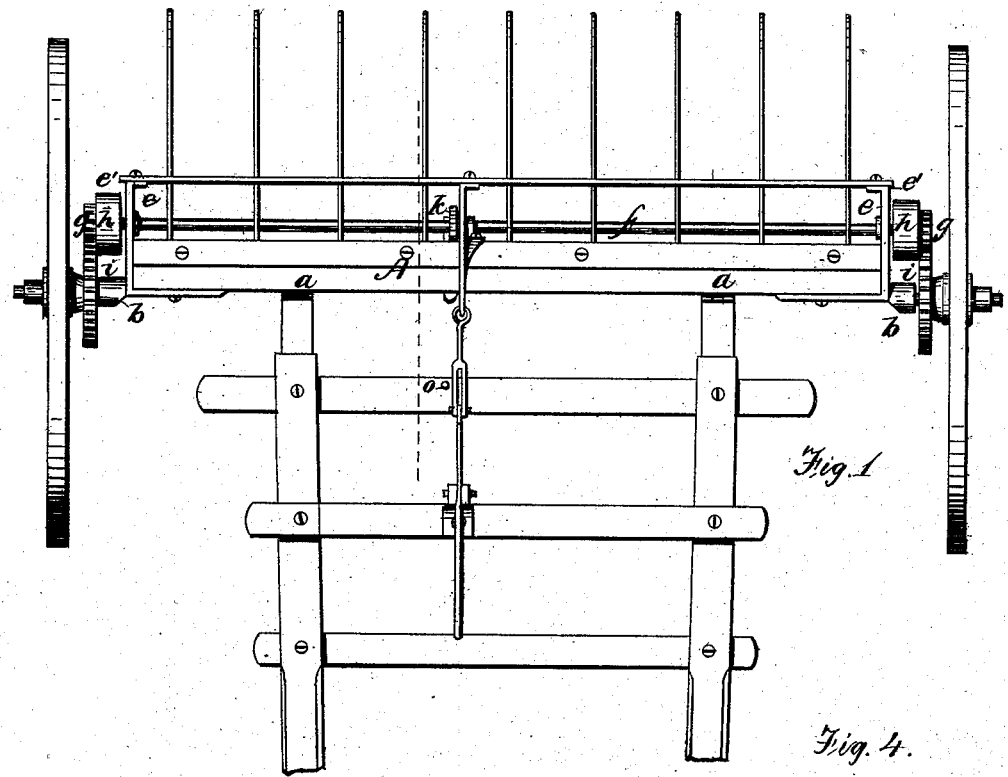
Fig. 1.
Fig. 4.
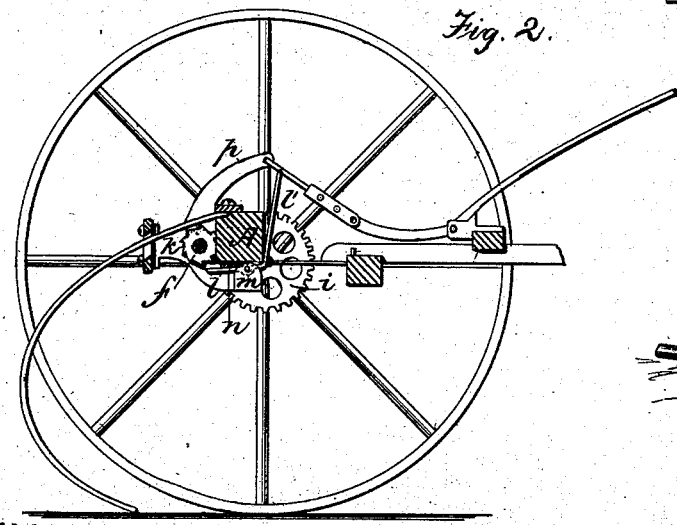
Fig. 2.
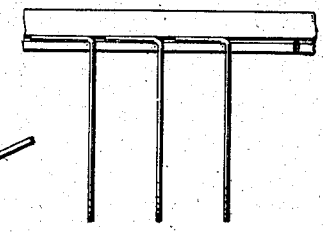
Fig. 3.

UNITED STATES PATENT OFFICE.

JAMES E. WISNER, OF FRIENDSHIP, NEW YORK.

IMPROVEMENT IN HORSE HAY-RAKES.

Specification forming part of Letters Patent No. 194,282, dated August 14, 1877; application filed August 28, 1876.

*To all whom it may concern:*

Be it known that I, JAMES E. WISNER, of Friendship, in the county of Allegany and State of New York, have invented a new and useful Improvement in Horse Hay-Rakes; and I do hereby declare the following to be a full, clear, and exact description of the same, reference being had to the accompanying drawings, forming part of this specification.

This invention relates to horse hay-rakes of that class in which either wheel separately, or both acting together, may operate at the will of the driver to automatically raise and drop the rake.

The details of my invention are fully set forth, and the particular features claimed by me as new are pointed out in the following specification.

The axle of this rake is represented in the drawings at A, and to this the shafts are hinged at $a\ a$ in the ordinary manner, but preferably at the lower front corner of the axle. This axle is supported at the ends in cast bearings $b\ b$. (Shown more particularly, detached, in Fig. 3.) These castings, it will be observed, have bearings $c\ c$ for the wheels, flanges $d\ d\ d'\ d'$, which serve for bolting and supporting the axle, and projections $e\ e$, for purposes which I proceed to explain. Against the inner part of the projections $e\ e$ bear the ends of the axles. The prolongations of these parts serve a double purpose. The extreme ends $e'\ e'$ act as supports for the tooth-board, which is bolted thereto. Within and between this bar and the axle are bearings in the arms $e\ e$ for the shaft $f$. This shaft extends from side to side of the machine, passing through the arms $e\ e$, and on the outer ends of it are pinions $g\ g$, turning thereon freely one way, but connected to the shaft by means of the pawl and ratchet in the boxes $h\ h$.

The pinions on the end of the shaft gear into pinions $i\ i$ on the hubs of the wheels. The construction and arrangement of the parts is obviously such that the wheels, when the machine moves forward, turning the pinions $e\ e$ thereby, by means of the pawl and ratchet, turn the shaft $f$. On this shaft $f$, about midway, is a small ratchet, $k$, the teeth of which, when the machine moves forward, turn toward a pawl, $l$, pivoted in the casting $m$. Underneath the shorter and pawl part of $l$ is a spring, $n$, which keeps the pawl normally out of gear. There is an upturned end of the pawl $l$, marked $l'$, which serves as a lever convenient to the foot of the driver, and by pressing it forward the driver, at will, may throw the pawl into gear with the ratchet-wheel. This holds the shaft and pinions thereon from rotating, and the forward revolution of the wheels consequently lifts the rake until the lever $l'$ comes down into contact with the stop $o$ on the cross-bar, when the pawl is thrown out of gear, and the rake is relieved and drops. The casting $m$ serves as a bearing for the pawl, and is formed to cover it. A projection of it supports the tooth-board, and another projection, $p$, serves as a lever for the ordinary hand-lifting appartus.

I have described this particular form of automatic lifting mechanism in connection with the arms which support the tooth-board, but it is plain that the same struts or arms would serve to support any other mechanism which might be used in the place of the rotating shaft and its auxiliary appliances, to connect intermittently the rake apparatus to the wheels, for the purpose of dumping.

In order to gain the best results, it is necessary that the shafts by which the machine is drawn should be on the same line, or nearly so, as the axes of the wheels. If pivotally attached above or below the axes, the draft of the horse will tend to lift or depress the rake. To accomplish this result in the most advantageous and economical manner, I hinge the shafts to the lower front corner of the axle, and make the castings $b\ b$ to correspond to this position of the shaft-connections—that is to say, the wheel-supports on the castings are so located in respect to the casting, particularly that part which receives the end of the axle, that, when the said axle is in place, the centers of the wheel-bearings will be on a line with the hinges connecting the shaft to the axle. In this case it is necessary to place the wheel-supports at the lower and forward corner of the casting as it stands when in place in the machine. This makes the fitting of the parts easy and certain.

In connection with the teeth secured in the axle, the studs affixed to said axle to hold the tooth forward form an independent simplification of the machine. It also serves to simplify the structure to form the arms which support the tooth-board with the end castings, and to make them act as supports at the same time for the automatic dumping apparatus.

In respect to the method of hinging the teeth to the axle, (shown in Figs. 2 and 4,) it should be observed that the hinging is accomplished by means of the bent ends of the teeth lying in the horizontal groove in the axle. This method of connection is not new, but it has special advantages in the construction here shown. In a rake having a rocking axle, where of necessity the axle is pivoted on the wheels and hinged to the shafts, so as to be raised more easily, care must be taken to have all the parts behind the pivoting as light as possible. This is especially necessary when the tooth-board is rigidly connected to the axle, and thus adds its weight thereto.

This lessening of the weight I accomplish by combining the described fastening for the teeth with the rocking axle and the rigidly-connected tooth-board. In this way all metal connections are rendered unnecessary and their weight avoided; and, further, the bent ends of the teeth may be hinged well forward, if desired, and thus the tooth-board brought very near the axle, and its weight thereon lessened, when the teeth fall.

I claim as my invention—

The combination of the shaft $f$, the arms which support the tooth-board, the pinions $g\ g$, the pawls and ratchets, and the pinions $i\ i$, and lever for engaging the gear with the ratchet-wheel, substantially as described.

JAS. E. WISNER.

Witnesses:
  FRANK MCKENNY,
  JNO. D. PATTEN.